D. MOORE.
Assignor to M. Hulbert & Co.
REVOLVING FIRE-ARM.
No. 7,610. Reissued April 17, 1877.
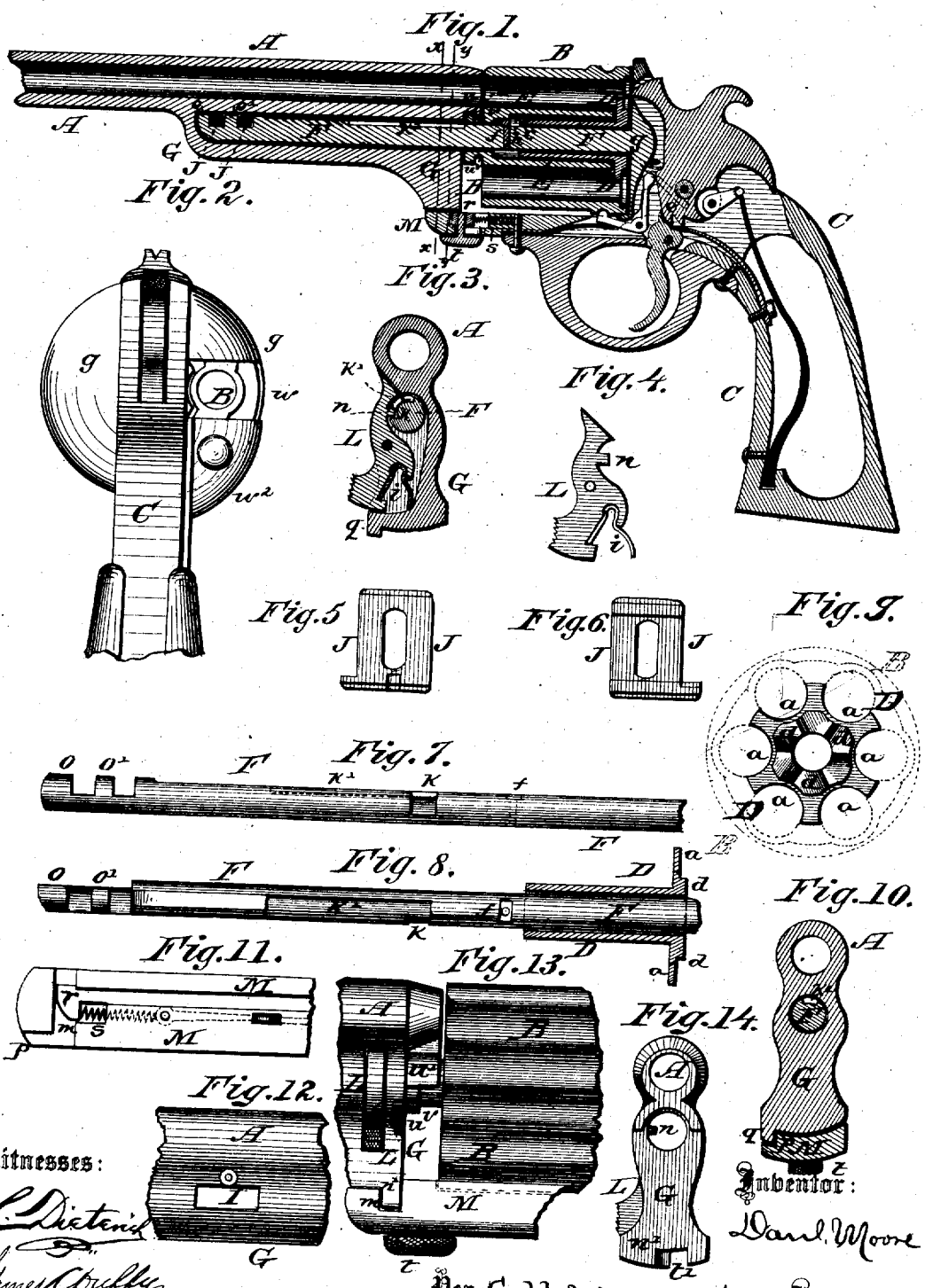
Witnesses:
P. C. Dieterich
James Duffy
Inventor:
Daniel Moore
Per C. H. Watson & Co. Attorneys.

UNITED STATES PATENT OFFICE.

DANIEL MOORE, OF BROOKLYN, NEW YORK, ASSIGNOR TO MERWIN, HULBERT & CO., OF NEW YORK CITY.

IMPROVEMENT IN REVOLVING FIRE-ARMS.

Specification forming part of Letters Patent No. 157,860, dated December 15, 1874; reissue No. 7,610, dated April 17, 1877; application filed March 30, 1877.

*To all whom it may concern:*

Be it known that I, DANIEL MOORE, of Brooklyn, in the county of Kings and State of New York, have invented certain new and useful Improvements in Revolving Fire-Arms; and it is hereby declared that the following is a full, clear, and exact description thereof, that will enable others skilled in the art to which it appertains to make and use the same, reference being had to the accompanying drawings, and to the letters of reference marked thereon, which form a part of this specification.

This invention relates to revolving fire-arms designed to use metallic-cased cartridges; and it consists in the construction and combination of parts, as will be hereinafter more fully set forth, and pointed out by the claims.

In the annexed drawings, Figure 1 is a vertical central section of a pistol embodying the invention. Fig. 2 is a rear-end view of the same. Fig. 3 is a cross-section on the line *y y*, Fig. 1. Fig. 4 is a face view of the spring-stop, by which the barrel, in sliding on the center-pin, is stopped at a given point. Figs. 5 and 6 are opposite face views of a key employed in locking the barrel on the center-pin. Fig. 7 is a side face view of the center-pin attached to the stock on which the cylinder revolves, and by which the barrel is connected with the stock. Fig. 8 is a top face view of the same with the cartridge-extractor and its sleeve in section. Fig. 9 is a rear face view of the cartridge-extractor, with the end of the cylinder shown by dotted lines. Fig. 10 is a cross-section of the pistol on the line *x x*, Fig. 1. Fig. 11 is an upper face view of the end of the stock of the frame. Fig. 12 is a side view of a section of the barrel and bracket, showing an opening for the locking key-bolt. Fig. 13 is a side view of a broken piece of the rear end of the barrel and bracket, and the front end of the cylinder. Fig. 14 is a rear-end view of the barrel and bracket.

A is the barrel; B, the cylinder, and C the frame.

The mechanism of this pistol, (shown in the drawing,) so far as relates to the hammer, trigger, main and sear springs, and the device for locking the cylinder rotarily, does not differ essentially from that now in use; a particular description of the same is therefore unnecessary.

D is the cartridge-extractor. It consists of a circular plate of metal, which fits into a corresponding circular recess in the rear end of the cylinder B. The peripheral line of this circular plate preferably coincides with a circle drawn through the centers of the several chambers of the cylinder, and semicircular notches *a* are made in the periphery of the said plate, corresponding to the said several chambers, so that when the said plate is in place in the circular recess in the cylinder, and cartridges are inserted in the chambers, a part of the circumference of the cartridges at their bases will lie within said semicircular notches, and corresponding portions of their projecting heads rest against the outer face of such plate, whereby, when the cylinder is drawn away from the said plate, the latter will act to withdraw the cartridges or their cases from the cylinder. This extractor is attached to a sleeve, E, which fits loosely onto the center-pin F, and enters the cylinder but only a portion of its length, the cylinder through which passes the center-pin being bored out to receive the sleeve, forming an annular recess between the center-pin and the cylinder the length of the sleeve, or a little longer, and the length of the sleeve is somewhat greater than that of the cartridge, so that when the cartridges are drawn by it entirely from the cylinder, the forward end of the sleeve will still remain in the cylinder.

A feather, *c*, on the sleeve passes into a slot in the cylinder, thereby securing the rotation of the cylinder with the extractor, and securing the adjustment of the notches to the chambers of the cylinder. On the rear face of the said extractor is the ratchet-wheel or annulus *d*, which is actuated by the pawl-lever *e*, (dotted lines,) to revolve the retractor, and with it the cylinder. In the center-pin F is fixed a stop-pin, *f*, between which and the end of the sleeve E there is some space, *h*. This permits a longitudinal movement of the sleeve on the pin, thereby preventing the cartridge-shells, after being withdrawn from the cylinder by sliding the cylinder forward on the center-pin, from being retained by their heads binding between the extractor and the recoil-shield *g*.

G is a bracket, made in one piece, solid with the barrel. It is bored nearly through longitudinally to receive the cylindrical center-pin F. I is a slot or opening through the bracket, to receive the locking key-bolt J. L is a retaining-stop, pivoted in an opening in the side of the bracket, and pressed into engagement with the notch or slot *k* in the center-pin by a spring, *i*. The said transverse slot *k* opens into a longitudinal slot, *k'*, thus permitting the brackets and barrel to be drawn off from the center-pin, until the nose *n* of the catch L, in traversing the said slot *k'*, is stopped against the end of said slot. Then, if it is desired to remove the barrel entirely from the center-pin, it may be done by pressing upon the lower end of the catch L, thereby lifting its nose out of the slot.

On the end of the center-pin F are formed key-bits *o o'*, the portion forming the bolts being flattened by the cutting away of about one-half of its diameter, so that it may pass under the key-bolt J, and then, by being turned a quarter around, locked into the bolt J. Near the fore end of the strap M of the frame is a slot, *m*, across the same, to receive a lip or projection, *n'*, formed on the face of the base of the bracket G. On one side of this face is also a notch, *p*, to receive the lip *q*, to prevent the bracket G from swinging beyond its proper point. In a longitudinal groove in the upper face of the said strap is a sliding catch, *r*, the beveled end of which is pressed forward into the slot *m* by a spiral spring, *s*.

When the bracket is swung to its place over the strap, the lip *n'* presses back the catch against the spring *s*, until the bracket reaches its position, and the lip *q* stops in the notch *p*, when the said catch, under the stress of said spring, slides forward into a notch, *t'*, cut across the lip *n'*, and thereby the bracket is securely locked in position. *t* is a finger-piece, the stem of which is screwed into the said catch *r*, through a slot in the strap, whereby the said catch may be withdrawn, and the bracket unlocked from the strap.

On the forward face of the cylinder is a projecting boss, *u*, having an annular recess, *v*, next to the face of the cylinder, and upon the rear end of the barrel is formed a semicircular collar, *u'*, recessed to receive the projecting rim of the boss *u*. When the barrel and cylinder are in position on the center-pin, this boss and collar form a lock, by which the cylinder is drawn forward on the pin with the barrel, and also a good gas-check. Provision is made for loading the cylinder through an opening, *w*, in the recoil-shield, covered by a slide, $w^2$, in the usual way.

By the extension of the center-pin along under the barrel within the drilled-out solid portion beneath it, which also forms the bracket-foot, when the parts are brought in position for firing, and the bracket-foot swung within the slot cut in the lower strap of the frame, all the parts are firmly locked together, and require no additional aid of key-bits, bolts, or catch devices, (to resist the recoil of the discharge,) either upon the center-pin or to act thereupon. It is evident that when the barrel with its bracket and the cylinder attached are placed upon the extended center-pin, and the foot of the bracket in position, said parts cannot be separated unless by transversely breaking the center-pin, or turning the bracket-foot out away from the slotted strap, or breaking the strap, which cannot be done by any usual revolver cartridge-charge, as the lines of resistance to separate the parts are in the angles of an arch. This strong and simple construction, whereby the center-pin not only forms the base-pin for sliding forward the barrel and the cylinder, but also forms the axial pin on which the barrel is rotated upon its center, so as to allow the foot of its bracket to swing into or pass out of the slot cut in the frame-strap, constitutes an important part of the invention.

Much difficulty has been experienced in preventing the gases from the discharge passing into the assembled parts lying in front of the cylinder, and particularly so as to the center-pin, when said center-pin is extended so as to be used as a base-pin for sliding forward the barrel and cylinder, as well as for a central axial pin for rotating the same. To prevent this difficulty the barrel is constructed at its rear end with the roof-like cover *u'*, that extends partially down upon the bracket rear, and sufficiently surrounds the center-pin at that point to deflect and throw off the gases from the parts described, and at the same time admit the rim of the covering-boss *u* on the front of the cylinder to take in the semicircular recess formed in the under part of the said deflector; thus it acts as a clutch for carrying forward the cylinder with the barrel, for extracting the cartridge-shells.

After firing this arm, the empty shells are removed as follows: The catch *r* is withdrawn from the notch *t'* by sliding back the finger-piece *t*, thereby unlocking the bracket G from the strap M. The bracket and barrel are then revolved a quarter round upon the center-pin, and slid forward upon it, carrying the cylinder with them until stopped by the spring-catch L, the nose of which will have reached the end of the slot *k'*. The extractor, by this movement, has been carried along with the cylinder until the sleeve E reaches the pin *f*, when it will stop, and, there holding the empty shells, cause them to be withdrawn from the cylinder, and the extractor being carried a little distance away from the recoil-shield, thus obviating the binding of the flanged head of the shells between the same, the shells will readily fall out. By reversing these motions the barrel and cylinder are carried back to their first position, and there locked in place.

If it is desired to remove the barrel and cylinder entirely from the center-pin, it may be done by pressing upon the spring-catch L, thus lifting its nose out of the slot *k'*.

When the parts are in position, as represented in Fig. 1, the bracket is locked onto the center-pin, not merely by the catch L, which, being a spring-catch, might not be secure, but also by the key-bolt J, the key bits *o o'* being then turned into the wards of the said bolt.

The use of the bolt J separate from the barrel is recommended; but, if preferred, one or more projections may be formed on the under side of the barrel, corresponding in form and position to the body of the bolt when in place, the nose of the front end of the bracket being cut away for the purpose, and the space thereby exposed capped by a separate piece screwed on.

I am aware that revolving fire-arms with extended slide-rods and sectional cored cylinders have been used, and I do not claim such as my invention; but,

Having thus fully described the invention, what is claimed as new, and desired to be secured by Letters Patent, is—

1. In a revolving fire-arm, the combination of a barrel, a cylinder, a forwardly-projecting combined slide-rod and center-pin, and an extractor, substantially as shown, whereby a partial rotation of the barrel on said center-pin permits the sliding forward longitudinally of the barrel and cylinder on said combined slide-rod and center-pin, and extracts the cartridge-shells, as specified.

2. In a revolving fire-arm, a longitudinally-sliding barrel, a cylinder, and a frame-strap, constructed substantially as described, in combination with an extended slide-rod center-pin, as and for the purpose specified.

3. The combination, in a revolving fire-arm, of the center-pin F, provided with the transverse and longitudinal slots *k* and *k'*, the spring-catch L, and the bracket G, as and for the purpose specified.

4. The combination, in a revolving fire-arm, of the center-pin F, the stop-pin *f*, the sleeve E, extractor D, and cylinder B, in which the extractor is permitted to move a little distance forward on the center-pin, away from the recoil-shield *s*, in the act of withdrawing the cartridge-shells, as and for the purpose specified.

5. The combination, in a revolving fire-arm, of the bracket G and the barrel A with the center-pin F, provided with the flattened key-bits *o o'* and the key-bolt J, as and for the purpose specified.

In testimony that I claim the foregoing I have hereunto set my hand this 29th day of March, 1877.

DANL. MOORE.

Witnesses:
LEVI BAXTER,
EDWIN MOORE.